L. R. BROOKS.
TESTING APPARATUS FOR METERS.
APPLICATION FILED AUG. 17, 1912.
1,128,405.
Patented Feb. 16, 1915.
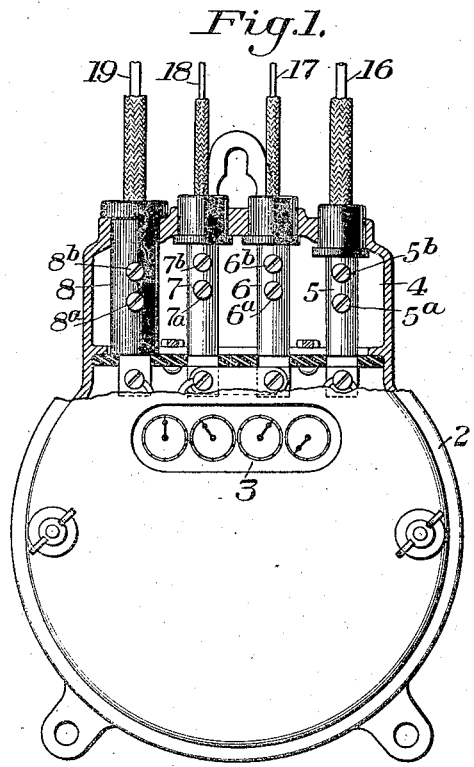
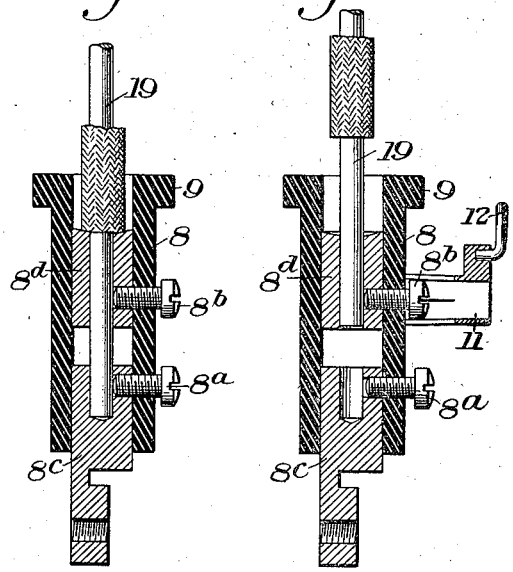
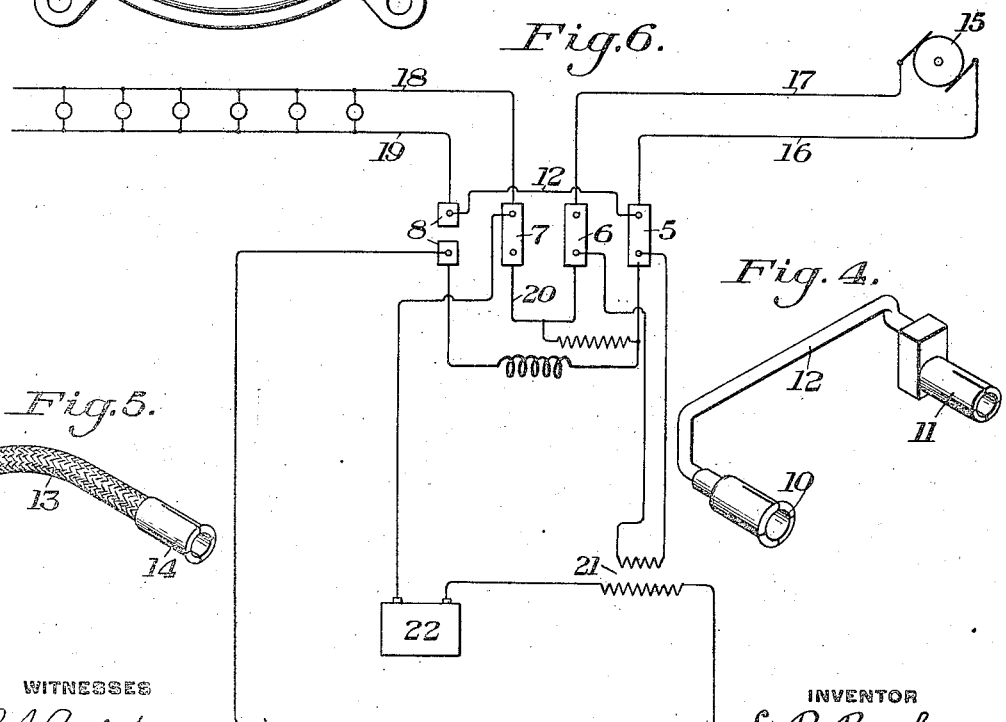
WITNESSES
R A Balderson
G B Fleming
INVENTOR
L. R. Brooks,
by Bakewell, Byrnes & Parmelee,
Attys

UNITED STATES PATENT OFFICE.

LAWRENCE RAE BROOKS, OF PITTSBURGH, PENNSYLVANIA, ASSIGNOR OF ONE-HALF TO CHARLES W. WARD, OF PITTSBURGH, PENNSYLVANIA.

TESTING APPARATUS FOR METERS.

1,128,405.

Specification of Letters Patent.   Patented Feb. 16, 1915.

Application filed August 17, 1912. Serial No. 715,654.

*To all whom it may concern:*

Be it known that I, LAWRENCE RAE BROOKS, a resident of Pittsburgh, in the county of Allegheny and State of Pennsylvania, have invented a new and useful Improvement in Testing Apparatus for Meters, of which the following is a full, clear, and exact description, reference being had to the accompanying drawings, forming part of this specification.

It is frequently necessary to test a customer's meter for the purpose of determining its accuracy, and it is very desirable to make such a test without interfering with the service. A number of different types of blocks have been provided for the connection of the service, load and meter wire terminals, which blocks have had conducting parts arranged in such manner as to facilitate the testing of meters without interfering with the service. These prior blocks however have been more or less complicated and expensive attachments or separable appliances which occupy considerable space and require special inclosing cases to protect the circuits from accidental contact and the service corporation from theft of current.

The object of this invention is to provide very simple and cheap means which can be readily manipulated so as to permit testing without interfering with the customer's service that is applicable to any of the common types of meters now in use without requiring any change whatever of the meter proper and is inclosed within and sealed up by the ordinary parts of the meter casing. This object is attained by dividing one of the conducting binding posts in the meter casing into two parts and insulating these parts from each other in such manner that the terminal of one of the circuit wires may be thrust in and secured to both parts of said divided post, or may be drawn out and secured to only one of said post parts so as to form a gap in one side of the line, and in forming the circuit wire securing parts in such manner that the necessary connections of the lines and the testing instruments may be readily made for testing without interfering with the service.

Figure 1 of the accompanying drawings shows a front view, with a part broken away, of a common type of meter arranged according to this invention. Fig. 2 shows a longitudinal section on larger scale, through the divided binding post with the circuit wire terminal pushed in and connecting both parts of the post. Fig. 3 is a similar section with the circuit wire terminal pulled out and secured to the outer part of the binding post so as to create the required gap for testing purposes. Fig. 4 shows a perspective view of a form of plug which may be used for bridging the proper binding posts and shunting the current around the meter so that there will be no disturbance with the service while the meter is being tested. Fig. 5 is a perspective view of a plug that may be used for connecting a testing apparatus lead to the binding posts. Fig. 6 is a diagrammatic representation of the circuits when the meter is being tested.

The meter illustrated in the views is one of a common type. This meter has a metal casing 2 and the usual indicating dial 3. In the upper part of the casing is the terminal binding post chamber 4. In this chamber are arranged the binding posts 5, 6, 7 and 8. These binding posts are made of conducting material and are provided with binding screws $5^a$, $6^a$, $7^a$, $8^a$, and $5^b$, $6^b$, $7^b$, $8^b$, which are employed to secure the terminals of the service wires 16 and 17 and the terminals of the load wires 18 and 19 that are thrust into the binding posts in the usual manner. The conducting binding post 8 is divided into two parts $8^c$ and $8^d$, these parts being held together in alinement but insulated from each other by a bushing 9 of insulating material. The binding screw $8^a$ passes through the bushing and into the opening in the part $8^c$, and the binding screw $8^b$ passes through the bushing and into the opening in the part $8^d$ of the binding post 8. When the terminal of the load wire 19 is pushed way in and is secured by the screws $8^a$ and $8^b$, it connects both parts of the binding post in the usual manner. When these binding screws are loosened, the terminal of the load wire 19 may be pulled out and then secured by tightening the binding screw $8^b$. When in this condition the two conducting parts of this binding post are separated and insulated from each other so that there will be a gap in this side of the line.

In order to shunt the current past the meter so that a test may be made without interfering with the service to the customer, the binding post 5 is connected with the outer section of the binding post 8 by means of the bridge 12 which has a hollow spring plug 10 that may be thrust on the binding screw 5<sup>b</sup> and a hollow spring plug 11 which may be thrust upon the binding screw 8<sup>b</sup>. The hollow plug 11 is shown as made open at both ends so that after the binding post 5 has been connected with the binding post 8 a screw driver may be inserted through the plug 11 for loosening and tightening the screw 5<sup>b</sup>.

In the diagrammatic representation of the circuits illustrated in Fig. 6, the service wires 16 and 17 lead from the generator 15 respectively to the binding posts 5 and 6 to which they are secured by the screws 5<sup>a</sup>, 5<sup>b</sup> and 6<sup>a</sup>, 6<sup>b</sup>. The load wires 18 and 19 lead respectively from the binding posts 7 and 8 to the lights, motors or other apparatus of the customer. The binding posts are connected with the meter wires as usual.

When it is desired to test the meter the ordinary cover plate for the terminal chamber is removed and the bridge piece 12 is first placed in position by thrusting the hollow plug 10 on the binding screw 5<sup>b</sup> and thrusting the hollow plug 11 on the binding screw 8<sup>b</sup>. This electrically connects the binding post 5 with the binding post 8 and shunts the current around the meter. The screws 8<sup>a</sup> and 8<sup>b</sup> are then loosened and the load wire 19 is withdrawn from connection with the inner part 8<sup>c</sup> of the binding post 8, after which the screw 8<sup>b</sup> is tightened so as to secure the terminal of the service wire 19 to the outer part 8<sup>d</sup> of the binding post 8. This is accomplished by inserting a screw driver through the open end of a hollow plug 11.

A testing apparatus comprising a testing meter 21 with the usual coils and a load box 22 are connected with the binding posts as indicated in Fig. 6, and the customer's meter is tested and adjusted so that its registrations will correspond with those of the testing meter. The leads of the testing meter may be provided with flexible cord 13 having hollow spring plugs 14 that may be thrust upon the heads of the proper binding screws in the terminal chamber.

This invention is adapted to be used in connection with any of the common types of meters without any change in the construction of the current registering parts or increase in the size of the casing.

A meter constructed according to my invention can be readily tested and adjusted without interfering in any way with the service. The change necessary to attain this end is slight and the cost is small. All the parts are contained within the regular meter casing so that they will be protected and sealed by the fastening of the usual terminal chamber cover.

The invention claimed is:

1. The combination of a meter casing having a terminal binding post chamber therein, conducting binding posts located in said chamber for the connection of the terminals of the service and load wires with the meter wires, and means for securing the service, load and meter wires to the binding posts, one of said binding posts being formed of two conducting parts that are alined with but insulated from each other in such manner that the terminal of one of the circuit wires may be thrust in and secured to both parts of said divided post or may be drawn out and secured to only one of said post parts so as to form a gap in one side of the line for testing purposes.

2. The combination of a meter casing having a terminal binding post chamber therein, conducting binding posts located in said chamber for the connection of the terminals of the service and load wires with the meter wires, one of said binding posts being formed of two conducting parts, an insulating bushing holding the conducting parts of the divided bushing separated but in alinement with each other, and means for securing the service, load and meter wires to the binding posts in such manner that the terminal of one of the circuit wires may be thrust in and secured to both parts of said divided post, or may be drawn out and secured to only one of said post parts so as to form a gap in one side of the line for testing purposes.

3. The combination of a meter casing having a terminal binding post chamber therein, conducting binding posts located in said chamber for the connection of the terminals of the service and load wires with the meter wires, one of said binding posts being formed of two conducting parts, and screws with projecting heads for securing the conducting wires to the binding posts in such manner that the terminal of one of the circuit wires may be thrust in and secured to both parts of said divided post, or may be drawn out and secured to only one of said post parts so as to form a gap in one side of the line, and testing instrument leads and shunt connections may be applied to the screw heads for testing purposes.

4. In combination with the field coils of an electric meter, and a case having two compartments, one of said compartments including said coils, load and service leads, means in the second compartment for connecting said service leads to two terminals of said field coils, fixed conducting members in said second compartment connected to the remaining terminals of said field coils, conducting devices leading to the load extending from said conducting members through a wall of said second compartment and at least one of which is movable out of contact with one of said fixed conducting members.

5. In combination with the field coils of an electric meter, and a case having two compartments, one of said compartments including said coils, load and service leads, means in the second compartment for connecting said service leads to two terminals of said field coils, fixed conducting members in said second compartment connected to the remaining terminals of said field coils, conducting devices leading to the load extending from said conducting members through a wall of said second compartment and at least one of which is slidably mounted in said wall and movable out of contact with one of said fixed conducting members.

In testimony whereof, I have hereunto set my hand.

LAWRENCE RAE BROOKS.

Witnesses:
 GEO. B. BLEMING,
 JESSE B. HELLER.